US009097792B2

(12) United States Patent
Kelly et al.

(10) Patent No.: US 9,097,792 B2
(45) Date of Patent: Aug. 4, 2015

(54) SYSTEM AND METHOD FOR ATMOSPHERIC CORRECTION OF INFORMATION (75) Inventors: Michael A. Kelly, Bristow, VA (US); Kwame Osei-Wusu, Owings Mills, MD (US); Edward E. Hume, Jr., Eldersburg, MD (US); Shadrian B. Strong, Catonsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 745 days.

(21) Appl. No.: 13/174,864

(22) Filed: Jul. 1, 2011

(65) Prior Publication Data
US 2013/0006534 A1   Jan. 3, 2013

(51) Int. Cl.
*G01W 1/00* (2006.01)
*G01S 3/78* (2006.01)

(52) U.S. Cl.
CPC ............... *G01S 3/7803* (2013.01); *G01W 1/00* (2013.01)

(58) Field of Classification Search
USPC .......................................................... 702/3
See application file for complete search history.

(56) References Cited

U.S. PATENT DOCUMENTS

| | | | |
|---|---|---|---|
| 5,675,081 A * | 10/1997 | Solheim et al. | 73/170.28 |
| 5,884,226 A | 3/1999 | Anderson et al. | |
| 6,163,381 A * | 12/2000 | Davies et al. | 356/521 |
| 6,356,646 B1 * | 3/2002 | Spencer | 382/103 |
| 6,480,788 B2 * | 11/2002 | Kilfeather et al. | 701/485 |
| 6,484,099 B1 | 11/2002 | Holzer-Popp et al. | |
| 6,560,536 B1 * | 5/2003 | Sullivan et al. | 701/469 |
| 6,646,724 B2 * | 11/2003 | Benz et al. | 356/5.01 |
| 6,665,438 B1 | 12/2003 | Lin | |
| 6,725,158 B1 * | 4/2004 | Sullivan et al. | 701/469 |
| 7,043,369 B2 | 5/2006 | Kolodner et al. | |
| 7,242,803 B2 * | 7/2007 | Miller | 382/173 |
| 7,268,880 B2 * | 9/2007 | Hinderling | 356/436 |
| 7,337,065 B2 | 2/2008 | Adler-Golden et al. | |
| 7,369,229 B2 * | 5/2008 | Bissett et al. | 356/328 |
| 7,491,944 B1 * | 2/2009 | Stork et al. | 250/390.07 |
| 7,552,037 B2 * | 6/2009 | Miller | 703/2 |
| 7,593,835 B2 | 9/2009 | Anderson et al. | |
| 7,957,608 B2 * | 6/2011 | Miller et al. | 382/274 |
| 8,073,279 B2 * | 12/2011 | Riley et al. | 382/254 |
| 8,094,960 B2 * | 1/2012 | Riley et al. | 382/254 |

(Continued)

OTHER PUBLICATIONS

K. K. Kong and J. A. Edwards, Slant range and cross range correction for polar format distortion in EAR imaging, IEE Proc-Radar: Sonar Navig., vol. 147, No. I, Feb. 2000.*

*Primary Examiner* — Sujoy Kundu
*Assistant Examiner* — Alvaro Fortich
(74) *Attorney, Agent, or Firm* — Noah J. Hayward (57) ABSTRACT

An atmospheric correction system (ACS) is proposed, which accounts for the errors resulting from the in-homogeneities in the operational atmosphere along the slant path by constructing atmospheric profiles from the data along the actual target to sensor slant-range path. The ACS generates a slant-range path based on the arbitrary geometry that models the sensor to target relationship. This path takes the atmosphere and obstructions between the two endpoints into account when determining the atmospheric profile. The ACS uses assimilation to incorporate weather data from multiple sources and constructs an atmospheric profile from the best available data. The ACS allows the user to take advantage of variable weather and information along the path that can lead to increased accuracy in the derived atmospheric compensation value.

18 Claims, 6 Drawing Sheets

(56) References Cited

U.S. PATENT DOCUMENTS

| | | |
|---|---|---|
| 2004/0153300 A1 | 8/2004 | Symosek et al. |
| 2006/0146326 A1* | 7/2006 | Nagashima et al. .......... 356/328 |
| 2010/0008595 A1* | 1/2010 | Riley et al. .................... 382/254 |
| 2010/0189363 A1* | 7/2010 | Riley et al. .................... 382/209 |

* cited by examiner

704 - UPWARD-LOOKING SCENARIO IN WHICH THE ELEVATION ANGLE FROM THE SENSOR TO THE TARGET IS POSITIVE

706 - DOWNWARD-LOOKING SCENARIO IN WHICH THE ELEVATION ANGLE FROM THE SENSOR TO THE TARGET IS NEGATIVE AND THE GROUND IS IN THE BACKGROUND OF THE TARGET

708 - DOWNWARD-LOOKING SCENARIO IN WHICH THE ELEVATION ANGLE FROM THE SENSOR TO THE TARGET IS NEGATIVE AND THE TARGET HAS THE DISTANT SKY AS A BACKGROUND

710 - DOWNWARD-LOOKING SCENARIO IN WHICH THE ELEVATION ANGLE FROM THE SENSOR TO THE TARGET IS NEGATIVE AND THE TARGET IS CLOSER TO THE SENSOR THAN THE EARTH'S LIMB (MINIMUM ALTITUDE) WITH THE SKY IN THE DISTANT BACKGROUND

712 - DOWNWARD-LOOKING SCENARIO IN WHICH THE ELEVATION ANGLE FROM THE SENSOR TO THE TARGET IS NEGATIVE AND THE TARGET IS BEYOND THE EARTH'S LIMB WITH THE SKY IN THE DISTANT BACKGROUND

FIG. 7

SYSTEM AND METHOD FOR ATMOSPHERIC CORRECTION OF INFORMATION

STATEMENT OF GOVERNMENTAL INTEREST

This invention was made with U.S. Government support under contract number FA8650-04-D-2413-D0006. The U.S. Government has certain rights in the invention.

CROSS REFERENCE TO RELATED APPLICATIONS

The present application claims priority from U.S. Provisional Application No. 61/233,208 filed Aug. 12, 2009, the entire disclosure of which is incorporated herein by reference.

BACKGROUND

The present invention relates to the field of atmospheric sciences, in particular, atmospheric correction in remote sensing.

Remote sensing implies gathering information of an object or phenomenon using sensing devices that are not in direct contact with that object. An example is a sensing device or a sensor, which detects and measures the radiation from a target through an atmosphere to estimate the location and or spectral signature of the target. As a beam of radiation propagates through the atmosphere it undergoes wavelength dependent modification by the atmospheric constituents and elements that it encounters. The spectral characteristics of the beam change due to losses of energy to absorption, gains of energy by emission, and redistribution of energy by scattering and optical refraction. These atmospheric induced modifications cause degradation of the remotely sensed images and can alter the apparent spectral signature of the target being observed.

Atmospheric correction may be used to provide more accurate and reliable results by removing atmospheric effects. Atmospheric constituents and elements of interest include clouds, water vapor, aerosols, and atmospheric gases, all of which are known to often absorb and/or scatter the target radiation signal before it reaches the sensor. Profiles of these disruptive atmospheric elements have to be specified properly in order to perform atmospheric correction accurately. Current atmospheric correction systems use a single vertical profile to represent the atmosphere over a large region.

Radiative transfer is the physical phenomenon of energy transfer in the form of electromagnetic radiation. Radiative transfer models or codes are known in the art to calculate radiative transfer of electromagnetic radiation through an atmosphere. Atmospheric profiles are needed as weather inputs to radiative transfer models such as MODerate Resolution Atmospheric TRANsmission (MODTRAN) to calculate the proportion of target radiation that propagates through the atmosphere to the sensor. Radiative transfer codes make the assumption that the operational atmosphere is plane parallel and horizontally invariant. As a result, many atmospheric correction tools require the user to select a weather report or model based vertical profile to represent atmosphere over a several Kilometer path. The implicit assumption has been that a profile can be used to generate an atmospheric correction that is representative over an area of hundreds of square Kilometers. This assumption and the use of a single vertical representative path have been proven false for events that occur in environments such as weather fronts and low pressure systems. This will be explained below using FIGS. 1-2 for conventional atmospheric correction systems.

Figure 1:
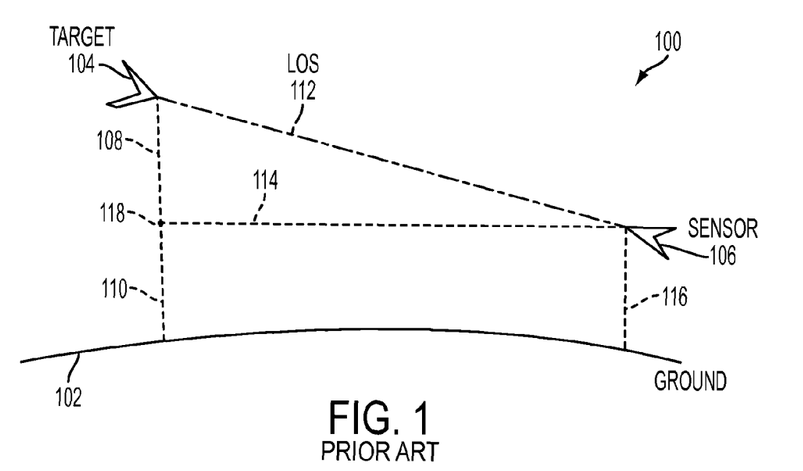
FIG. 1 illustrates a scenario 100 for a conventional atmospheric correction system.

FIG. 1 illustrates a scenario 100 for a conventional atmospheric correction system.

As illustrated in the figure, scenario 100 includes a ground 102, a target 104, and a sensor 106.

FIG. 1 shows an example where target 104 and sensor 106 are at two different altitudes over a horizontal distance 114. As illustrated in the figure, a line 112 represents line of sight (LOS) between target 104 and sensor 106. A point 118 represents an altitude 110 from ground 102 looking straight through the atmosphere from sensor 106. Sensor 106 is at an altitude 116 from ground 102. A line 108 represents the difference in altitudes between target 104 and sensor 106.

Conventional atmospheric correction systems use a single vertical profile to represent the atmosphere over horizontal distance 114. To generate an atmospheric profile, conventional atmospheric correction systems assume a homogeneous atmosphere along line of sight 112 and only take in to account the difference in altitude 108 between target 104 and sensor 106 with no horizontal variability. This assumption and the use of a single vertical representative path have been proven incorrect for events that occur in environments such as weather fronts and low pressure systems. This will be explained further using FIG. 2.

Figure 2:
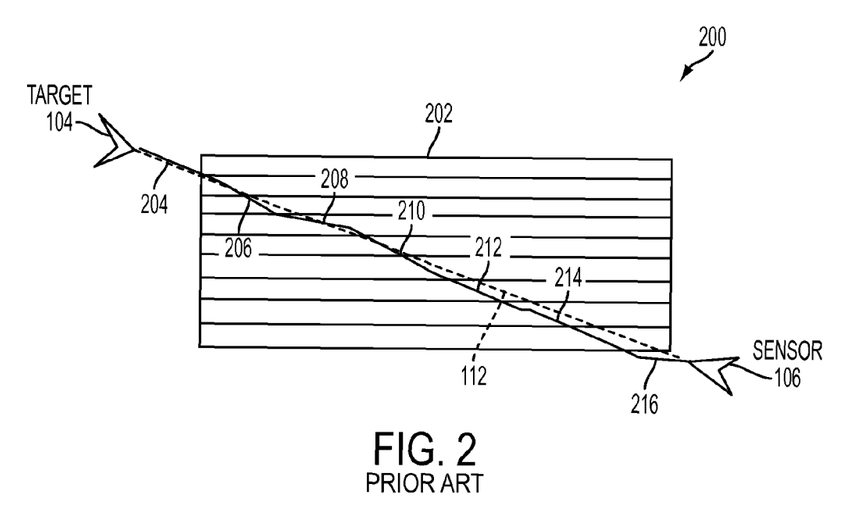
FIG. 2 illustrates a detailed view of the signal path between the target and the sensor of conventional atmospheric correction systems.

FIG. 2 illustrates a detailed view of the signal path between the target and the sensor of conventional atmospheric correction systems.

As illustrated in the figure, assuming that sensor 106 is collecting emissions from target 104 represented by signal 204. A vertical plane 202 represents operational atmosphere over a large region between target 104 and sensor 106, which is assumed to be plane parallel and horizontally invariant by conventional atmospheric correction systems. In reality, as signal 204 travels along line of sight 112, it gets refracted because of the in-homogeneities in the operational atmosphere as represented by horizontal lines inside vertical plane 202. The refraction of signal 204 is represented by signal 206, which gets further refracted and so on. Signal 204 is sequentially refracted by segments 206, 208, 210, 212, 214 and 216 before it reaches sensor 106. Conventional atmospheric corrections systems use only a single vertical profile to perform refraction calculations. Although it is used to calculate refractivity associated with changing altitude along line of sight 112, the conventional approach neglects horizontal inhomogeneities in the atmosphere between target 104 and sensor 106 that can substantially alter the rate of refraction. This neglect can produce large errors that significantly affect the quality of the data retrievals.

Conventional atmospheric correction tools mostly collect data from numerical weather prediction models and use a climatological relationship to generate atmospheric data along the line of sight. Some conventional atmospheric correction tools may also use radiosonde data or climatology itself to generate atmospheric data along the line of sight. It has been proven through analysis that the assumption of horizontal uniformity for weather profile is not applicable for events or observations that occur close to weather fronts, low pressure systems, or land/sea breezes near coastlines and it can be shown that these types of weather profile are significantly variable in terms of their impact on atmospheric correction.

As discussed above with reference to FIGS. 1-2, conventional atmospheric correction systems may not accurately represent the operational atmosphere of their line of sight because the geometry for the path of data being collected usually travels between two different altitudes over long horizontal distances with highly variable atmospheric conditions. The errors, resulting from the in-homogeneities in the operational atmosphere along the slant path can result in incorrect assessment of atmospheric compensation value. Atmospheric correction errors such as these can lead to incorrect intelligence assessments that are based on poor retrievals of technical intelligence.

What is needed is an atmospheric correction system, which can generate atmospheric profiles from the data along the actual target to sensor slant-range path based upon the target to sensor geometry.

BRIEF SUMMARY

The present invention provides an atmospheric correction system, which can generate atmospheric profiles from the data along the actual target to sensor slant-range path based upon the target to sensor geometry.

The present invention provides a system for use with a sensor, a target and atmosphere data between the sensor and the target. The system includes an observation setup portion, a slant-range profile generator, a radiative environment portion, a sensor observation portion, an atmospheric effects removal portion and a target signal generator. The observation setup portion can generate sensor location data based on a location of the sensor and can generate target location data based on the location of the target. The slant-range profile generator can generate slant-range profile data based on the sensor location data and the target location data. The radiative environment portion can generate environment data of the atmosphere at two locations, respectively, between the sensor and the target based on the atmosphere data between the sensor and the target. The sensor observation portion can generate sensor parameter data based on a parameter of the sensor. The atmospheric effects removal portion can generate mean transmittance data of the atmosphere between the sensor and the target based on the slant-range profile data, the environment data and the sensor parameter data. The target signal generator can generate a target signal based on the mean transmittance data.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Aspects of the present invention provide an Atmosphere Correction System (ACS) and method for atmospheric correction, which accounts for the errors resulting from the in-homogeneities in the operational atmosphere along the slant path by constructing atmospheric profiles from the data along the actual target to sensor slant-range path. The ACS generates a slant-range path based on arbitrary geometry that models the sensor to target relationship. This path takes the atmosphere and obstructions between the two endpoints into account when determining the atmospheric profile. The ACS uses assimilation to incorporate weather data from multiple sources and constructs an atmospheric profile from the best available data. The ACS allows the user to take advantage of variable weather and information along the path that can lead to increased accuracy in the derived atmospheric compensation value.

The ACS, in accordance with aspects of the present invention, primarily supports long slant-range target to sensor lines of sight. Long slant-range target to sensor lines of sight often present a unique geometry that forces the operator to consider the position of the target to sensor line of sight in relation to the Earth's limb when constructing a representative atmospheric profile. The slant-path is based on the calculated geometry that connects the location of the sensor and the target as specified by the user. This will be explained further with reference to FIGS. 3-7.

Figure 3:
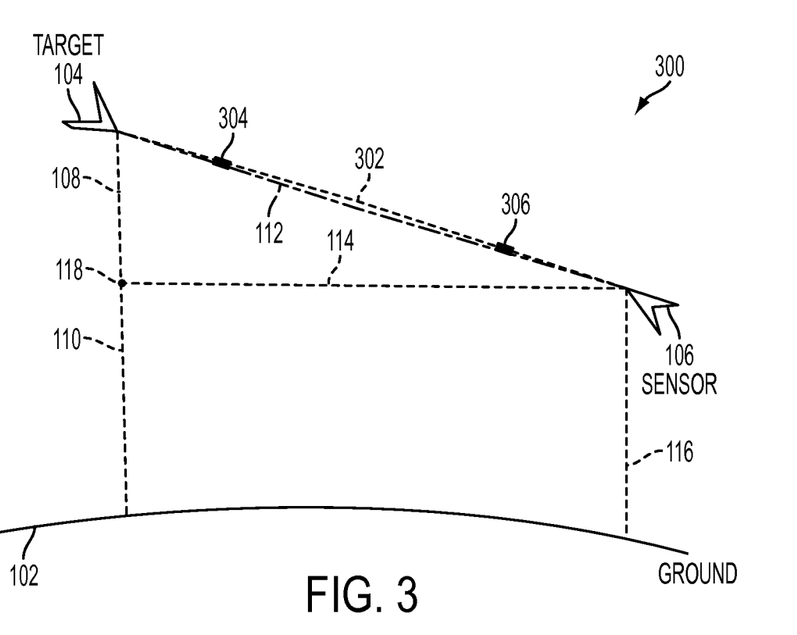
FIG. 3 illustrates a scenario 300 for a proposed ACS, in accordance with an aspect of the present invention.

FIG. 3 illustrates a scenario 300 for an example ACS, in accordance with an aspect of the present invention.

As illustrated in the figure, scenario 300 includes few elements of FIG. 1, mainly ground 102, target 104, sensor 106 and LOS 112. Assuming that sensor 106 is collecting emissions from target 104 represented by signal 302 along line of sight 112. An ACS generates a slant-range path based on geometry that models the relationship between sensor 106 and target 104. This slant-range path takes the atmosphere and obstructions between the two endpoints, mainly target 104 and sensor 106, into account when determining the atmospheric profile. Although it may be difficult to illustrate horizontal path deviations in the figure, the path deviates in three dimensions. As such, it is a "slant-range path" because the path takes into account the difference in height (z-coordinate) in addition to a difference in the left and right (x- and y-coordinates), thus making a slant.

Points 304 and 306 represent at least two locations along the slant-range path where environment data is collected to generate an atmospheric profile for the operational atmosphere between target 104 and sensor 106. The ACS provides a slant-range profile that incrementally samples the atmosphere by collecting data from satellites and other sensors and integrating it along the line of sight in order to generate a very highly accurate and robust profile of atmospheric data. This will now be explained further with reference to FIG. 4.

Figure 4:
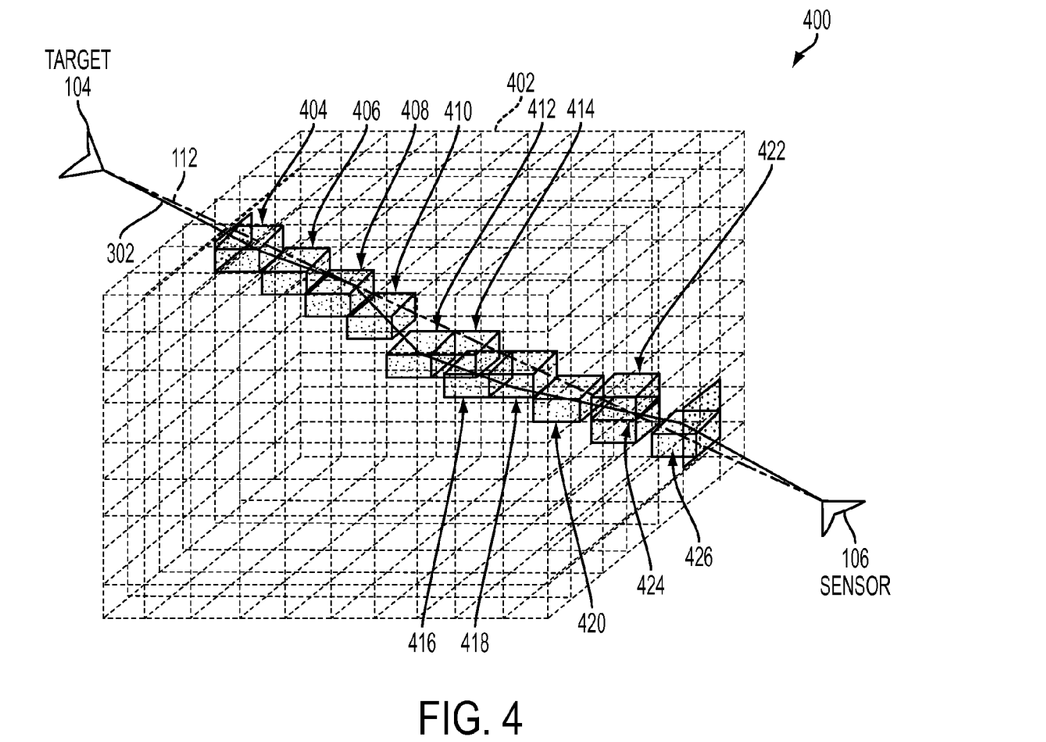
FIG. 4 illustrates a 3-D view 400 for the slant-range path of scenario 300, in accordance with an aspect of the present invention.

FIG. 4 illustrates a 3-D view for the slant-range path of scenario 300, in accordance with an aspect of the present invention.

As illustrated in the figure, as signal 302 travels from target 104 to sensor 106 along line of sight 112, it gets refracted because of the in-homogeneities in the operational atmosphere. A cube 402 represents the effects of the operational atmosphere, where blocks 404, 406, 408, 410, 412, 414, 416, 418, 420, 422, 424 and 426 represent some of the locations along line of sight 112, where the data may be collected by an ACS. Each of the blocks 404-426 represents a homogeneous atmosphere with its own atmospheric profile or data, which is provided by multiple sources and integrated by an ACS, as will be discussed later on using FIG. 6.

For each of the blocks 404-426, an ACS takes in to account latitude, longitude and altitude along the slant-range path and has the capability to incorporate data from multiple sources for each block in real time, based on the resolution provided by the data provider. For example, weather data provided by weather prediction models may be on the 10 kilometer (cubed) resolution, whereas, dust and particulate data obtained from another data provider may be on the 100 meter (cubed) resolution. It should be noted that the resolution is referring to the length of a side of a block, not a volume of the block. Further, the block need not be uniform whereas each side may have a different size. Still further, it should be noted that based on the resolution of the data provided, size of the individual blocks may vary, for example, for higher resolutions or more data, the block size may be smaller.

Each of the blocks 404-426 represents a homogeneous atmosphere for that block but the atmosphere for its neighboring blocks may or may not be the same. As signal 302 travels from target 104 to sensor 106 through blocks 404-426, the amount of refraction may be different or same for each block, when it crosses boundaries from one block to another block due to different atmospheric profile of each block. Hence, the amount of refraction for each block will be dependent on the atmospheric profiles of the previous blocks. This is explained further for first few blocks of FIG. 4 as signal 302 travels from target 104 to sensor 106.

Signal 302 starts from target 104 and enters block 404 first. Block 404 has a homogeneous atmosphere with atmospheric profile which may be different than the profile of the atmosphere between target 104 and block 404. Due to the change in atmospheric profiles, signal 302 bends as it goes through block 404 before entering block 406. The atmospheric profile of block 406 may be different than atmospheric profiles of blocks 404 and 408. Hence, signal 302 bends further as it goes through block 406 before entering block 408. Signal 302 bends at a different angle as it goes through block 408. The atmospheric profile of block 410 is same as block 408 but different than block 412, therefore signal 302 goes straight through block 410 but bends again as it goes through block 412. Similarly, as signal 302 travels further through blocks 414-426, depending on the individual atmospheric profile of each block, it gets refracted further before it reaches sensor 106.

An ACS collects data from each block 404-426 and integrates it to generate an atmospheric profile for the slant range path between target 104 and sensor 106. The atmospheric profile generated by an ACS, in accordance with aspects of the invention, provides a more realistic atmospheric correction of signal 302 as it travels through a non-homogeneous atmosphere between target 104 and sensor 106.

As discussed with reference to FIG. 4, a slant-range profile that incrementally samples the atmosphere along the actual line of sight is used by an ACS in accordance with aspects of the present invention. Data collected therefore is integrated to generate an atmospheric profile to be used for atmospheric correction. This will now be further explained with reference to FIG. 5.

Figure 5:
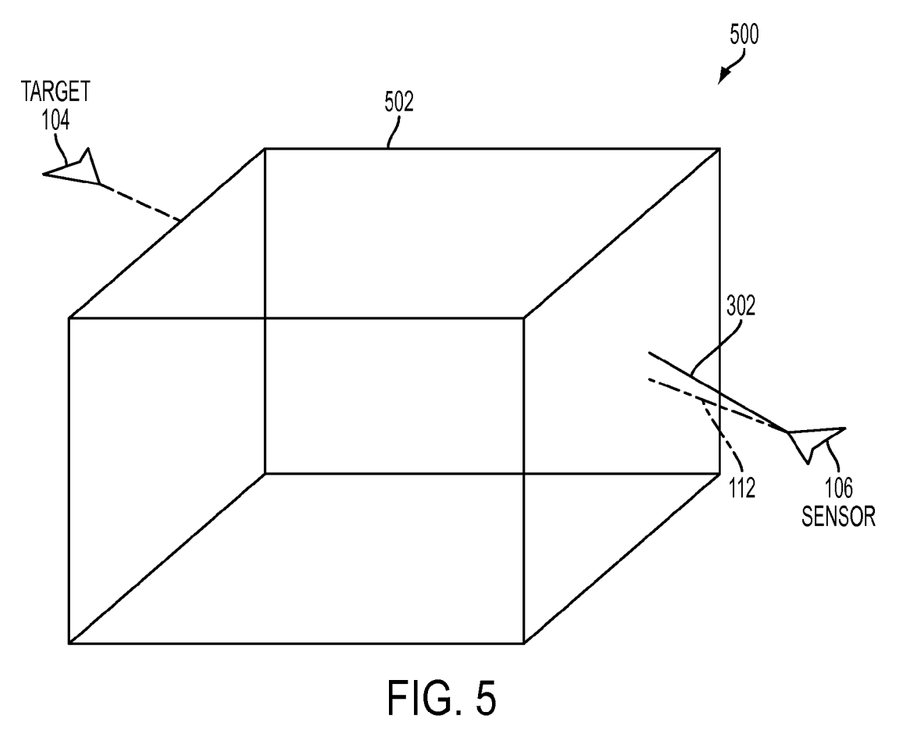
FIG. 5 illustrates an integrated 3-D view 500 of the slant-range path of scenario 300, in accordance with an aspect of the present invention.

FIG. 5 illustrates an integrated 3-D view 500 of the slant-range path of scenario 300, in accordance with an aspect of the present invention.

As illustrated in the figure, a cube 502 represents an integrated view of the slant-range path between target 104 and sensor 106. Cube 502 is shown as a single entity, which represents the effects of operational atmosphere, considering both traditional and non-traditional sources, with signal 302 getting refracted therein along the slant-range path.

As discussed with reference to FIG. 4, data provided from multiple sources is collected incrementally at each location, as represented by blocks 404-426, along line of sight 112 in order to generate a realistic atmospheric profile by an ACS in accordance with aspects of the present invention. Considering the effects of each block due to its own atmospheric profile and the difference in the atmospheric profiles between the neighboring blocks, an ACS integrates the data for each block along line of sight 112 and provides a transfer function for signal 302, which represents an overall atmospheric profile of the slant range path between target 104 and sensor 106. Using the transfer function for signal 302, cube 402 with blocks 404-426 can be transformed to a mean block, as shown by cube 502. Signal 302 is refracted through cube 502 based on the properties of the transfer function as it travels from target 104 to sensor 106.

An ACS, in accordance with an aspect of the present invention, may also include data from the sides and the background of target 104, while calculating the transfer function for signal 302 as it travels from target 104 and sensor 106. The effect of the operational atmosphere, as represented by refracted signal 302 coming out of cube 502, may be different in this example as compared to FIG. 2 due to the inclusion of slant-range path in the calculations to generate an overall atmospheric profile. Conventional atmospheric correction system as discussed with reference to FIG. 2 avoid the geometries between target 104 and sensor 106 and assume a horizontally uniform atmosphere for generating atmospheric profiles. A functional description of an example embodiment of an ACS, in accordance with an aspect of the present invention will now be further described with reference to FIGS. 6-7.

Figure 6:
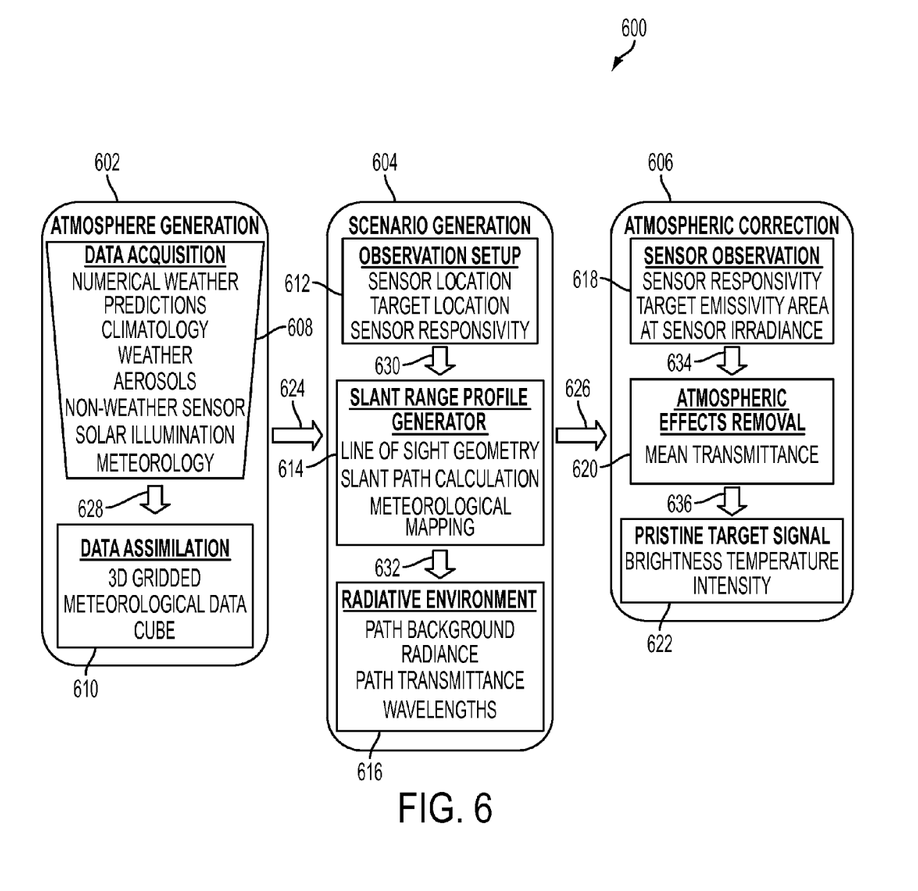
FIG. 6 illustrates a functional diagram of an ACS, in accordance with an aspect of the present invention.

FIG. 6 illustrates a functional diagram of an ACS, in accordance with an aspect of the present invention.

As illustrated in the figure, an ACS 600 includes an atmospheric generation module 602, a scenario generation module 604 and an atmospheric correction module 606. Atmospheric generation module 602, scenario generation module 604 and atmospheric correction module 606 are illustrated as individual devices, however, in some embodiments at least two of atmospheric generation module 602, scenario generation module 604 and atmospheric correction module 606 may be combined as a unitary device. Further, in some embodiments at least one of atmospheric generation module 602, scenario generation module 604 and atmospheric correction module 606 may be implemented as a tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a tangible computer-readable medium. Thus, any such connection is properly termed a tangible computer-readable medium. Combinations of the above should also be included within the scope of tangible computer-readable media.

Atmospheric generation module 602 further includes a data acquisition module 608 and a data assimilation module 610. Data acquisition module 608 and data assimilation module 610 are illustrated as individual devices, however, in some embodiments they may be combined as a unitary device. Further, in some embodiments at least one of data acquisition module 608 and data assimilation module 610 may be implemented as a tangible computer-readable media for carrying or having computer-executable instructions or data structures stored thereon.

Scenario generation module 604 further includes an observation setup module 612, a slant-range profile generator module 614 and a radiative environment module 616. Observation setup module 612, slant-range profile generator module 614 and radiative environment module 616 are illustrated as individual devices, however, in some embodiments at least two of observation setup module 612, slant-range profile generator module 614 and radiative environment module 616 may be combined as a unitary device. Further, in some embodiments at least one of observation setup module 612, slant-range profile generator module 614 and radiative environment module 616 may be implemented as a tangible computer-readable media for carrying or having computer-executable instructions or data structures stored thereon.

Atmospheric correction module 606 further includes a sensor observation module 618, an atmospheric effects removal module 620 and a pristine target signal module 622. Sensor observation module 618, atmospheric effects removal module 620 and pristine target signal module 622 are illustrated as individual devices, however, in some embodiments at least two of sensor observation module 618, atmospheric effects removal module 620 and pristine target signal module 622 may be combined as a unitary device. Further, in some embodiments at least one of sensor observation module 618, atmospheric effects removal module 620 and pristine target signal module 622 may be implemented as a tangible computer-readable media for carrying or having computer-executable instructions or data structures stored thereon.

For purposes of discussion the term "ACS" refers to example ACS 600. In one embodiment of the invention a target may be target 104 and a sensor may be sensor 106.

Atmospheric generation module 602 acquires data from different sources in order for the ACS to generate realistic atmosphere profiles that are slant-range. Data acquisition module 608 acquires data from satellites and other sensors, which is integrated along the line of sight in order to generate a highly accurate and robust atmospheric profile. Some non-limiting examples of data acquisition sources include systems or services that provide numerical weather nowcasting and forecasting, climatology information, aerosol modeling, non-weather sensor information, solar illumination and meteorology information.

Numerical weather predictors and nowcasters use computer models to provide the current state (nowcast) and predictions (forecasts) on many atmospheric variables such as temperature, pressure, wind and rainfall. Climatology is a part of atmospheric sciences and provides information on climate or weather conditions averaged over long periods of time. Weather of a particular place and time is determined by several variables such as moisture, wind velocity, pressure and atmospheric temperature. Aerosols are tiny airborne solid and liquid particles, which are present throughout the atmosphere. Some non-limiting examples of aerosols include smog, air pollution, oceanic haze, sea salt, and air pollution. Non-weather sensors provide data from sources other than traditional weather models. Solar illumination knowledge provides useful information about the illumination and the location of the sun with respect to the target and its background. Meteorology focuses on weather processes and short term forecasting based on atmospheric variables such as temperature, air pressure and water vapor and their interaction. Data from all the above sources is collected and integrated to generate an atmospheric data 628 provided to data assimilation module 610.

Data assimilation module 610 provides a three-dimensional (3-D) gridded meteorological data cube by assimilating multiple types of traditional weather models and observations, in addition to incorporating sensed data that is unassociated with meteorological data collection. A 3-D gridded data is associated with a three-dimensional grid over an area of interest, where the grids may be nested inside each other at various resolutions depending on the type of dataset. Data assimilation is performed individually for each data provider based on the resolution for each data set. The capability to assimilate weather data from multiple sources in addition to numerical weather prediction models has been demonstrated to greatly improve the impact of atmospheric correction on remotely sensed data.

Numerical weather prediction models used for short term weather forecasting are called mesoscale models. The mesoscale numerical weather prediction models used by the ACS ingest observed weather data that the model generation system uses to construct the initial conditions required to produce models such as Fifth-Generation NCAR/Penn State Mesoscale Model (MM5), Weather Research and Forecasting (WRF) model, and Nonhydrostatic Mesoscale Model (NMM). The Fifth-Generation NCAR/Penn State Mesoscale Model was developed at Penn State and NCAR and is a limited area, non-hydrostatic, terrain following, sigma coordinate model, designed to simulate or predict mesoscale and regional scale atmospheric circulation. Non-hydrostatic dynamics allow the MM5 model to be used at a few-kilometer scale. WRF-NMM was developed by the National Oceanic and Atmospheric Administration (NOAA), National Centers for Environmental Prediction (NCEP) and is suitable for use in a broad range of applications across scales ranging from meters to thousands of kilometers.

The ACS also assimilates various satellite based cloud data obtained from the Cloud Depiction and Forecasting System II (CDFS II) in the formation of its meteorological data cube. Operated by the Unites States Air Force Weather Agency (AFWA), CDFS II constructs 3-D depictions of cloud amount and type from surface and space based data collection systems and provides near real-time cloud analysis and forecasting at a certain resolution. Cloud analysis software uses highly advanced algorithms and operational infrastructure to collect and analyze the sensor data from three classes of military and civilian meteorological satellites in addition to a feed of weather forecasts from Air Force Global Theater Weather Analysis and Prediction System.

The assimilation process involves the distribution of observed cloud top heights into their appropriate position within the columns of the meteorological data cube. CDFS II model provides current and future information about the weather elements that impact warfighter operations and systems. These models or tools provide weather information about cloud cover, water vapor, and aerosols, but do not explicitly describe the impacts of the environment on weapon systems and sensors to target line of sight. However, it has been shown that the meteorological fields that are generated by numerical weather prediction models often exhibit errors due to atmospheric chaos (i.e. the butterfly effect; Lorenz 1963), imperfect model equations, inadequate spatial resolution, and incorrect initial conditions that can propagate to the operational effects such as transmittance.

The ACS assimilates observations of clouds, temperature and moisture into the cloud analysis instead of relying solely on the model's cloud water/ice fields that are known to produce the aforementioned errors associated with weather prediction models. The assimilated data used by the ACS comes from both traditional and non-traditional sources. The traditional datasets are defined as data obtained from instruments specifically used to measure meteorological parameters such as radiosondes, research satellites, and surface observers. Radiosondes measure various atmospheric variables, such as, temperature, pressure, altitude, latitude, longitude, relative humidity, wind (speed and direction) and cosmic ray readings at high altitudes.

Conversely, the non-traditional datasets for the ACS are defined as data obtained with sensors with a primary mission other than collecting meteorological information. These datasheets haven been deemed useful because they are often designed to sense objects through the atmosphere and they usually operate in parts of the electromagnetic spectrum in which the number of absorption lines associated with water vapor and other atmospheric constituents is relatively small. Lastly, depending on which part of the spectrum these instruments utilize, meteorological algorithms may already exist to retrieve water vapor and cloud characteristics.

As discussed above with reference to data acquisition module 608 and data assimilation module 610, the ACS collects and assimilates data from multiple sources in order to generate realistic atmospheric profiles that are slant range. Referring back to FIG. 4, the data is collected by the ACS at highlighted cubes 404 along line of sight 112 at different resolutions as provided by the data provider. Atmospheric generation module 602 uses integrated data 628 and provides a dynamic data cube 624, which is tailored to a specific operation to scenario generation module 604. Since dynamic data cube 624 is generated specific to a region of interest between the target and the sensor, a huge communication pipeline is not required in order to use this data on a dynamic basis.

Scenario generation module 604 provides the geometry and location of the target following the line of sight between the target and the sensor. Observation setup module 612 receives information on the locations of the sensor and the target as inputs. Sensor parameters imply different parameters affecting the responsivity of the sensor, for example, wavelengths, precision, etc. Sensor responsivity implies relating a signal to the sensor responsiveness in different spectral bands. For example, depending on whether the sensor is an infra-red or an optical sensor, scattering or absorption needs to be considered in order to generate the profiles accordingly. For calculating the slant-range profile, sensor parameters play an important role, especially when both the background and the foreground are taken in to account.

Slant-range profile generator module 614 receives a location data 630 provided by observation setup module 612 and data cube 624 from atmospheric generation module 602. Slant-range profile generator module 614 first calculates line of sight geometry between the sensor and the target before making slant path calculations. Line of sight geometry calculations take in to account signal from the target to the sensor and their location relative to the earth. Slant path calculation takes in to consideration one or more of these geometries: air-to-air, air-to-ground, air-to-space, space-to-ground, space-to-air, space-to-space (but through the atmosphere), ground-to-space, and ground-to-air. Slant range geometries considered by ACS 600 will be discussed further on using FIG. 7.

In order to calculate the slant-range path, environment between the target and the sensor is determined as well as the environment behind the sensor and behind the target for accurate scenario generation. For example, in order to calculate the temperature the target is emitting at, it is desirable to know the background of the target in order to determine how much radiation is being emitted, which is not part of the target. In the case when the Sun is behind the target, there could be significant scattering from behind.

Slant-range profile generator module 614 generates a slant-range profile by incrementally sampling the atmosphere along the actual line of sight between the target and the sensor. The distance between the target and the sensor is divided in to two or more locations, for example, every kilometer, where the data is collected in real time. For every location, altitude, longitude and latitude is known along with some other profiles. In addition to that, slant-range profile generator module 614 uses meteorological mapping to integrate the effects of temperature, weather, aerosols, and pressure, etc. at each location before generating a slant-range profile data 632.

Radiative environment module 616 receives slant-range profile data 632 and integrates the effect of radiative environment before the atmospheric correction is performed. In order to calculate the optical properties of the atmosphere, amount of radiation that is going through the atmosphere needs to be calculated. When there is energy transfer in the form of electromagnetic radiation through a medium, absorption, emission and scattering effects of radiative environment due to the in-homogeneities in the atmosphere need to be considered. As a signal propagates from the sensor to the target, atmosphere attenuates parts of the signal. Atmosphere also has its own temperature and reflectivity so it adds energy into the path, which is not emitted by the target. Radiative environment module 616 considers the effects of path background radiance, path transmittance and wavelengths in order to accurately provide scenario generation data.

Path radiance represents radiation emitted or scattered into the sensor's line of sight and may be thought of as atmospheric noise, since it adds spurious information to the target being observed. Path background radiance implies the amount of radiance, which is coming from behind the target along the line of sight. Amount of radiation is calculated irrespective of whether the target is present or not to find the optical properties of the atmosphere.

Path transmittance is the transmittance from the target to the sensor, which implies the intensity of the radiation that has passed through an atmosphere at a specified wavelength, in comparison to the intensity of the radiation coming out of the target. The transmittance is calculated over a wide range, therefore only those transmittances are picked out, which are appropriate for a given wavelength for the operation of the sensor.

Radiative environment module 616 also considers the effects of various wavelengths for the electromagnetic radiation going through the atmosphere. The behavior of electromagnetic radiation is dependent on its wavelength. Generally, electromagnetic radiation is classified by wavelength into radio wave, microwave, infrared, the visible region or light, ultraviolet, X-rays, and gamma rays.

Radiative environment module 616 provides the effects of the radiative environment between the target and the sensor by considering path background radiance, path transmittance and wavelengths as discussed above.

Scenario generation module 604 receives meteorological data cube 624 from atmosphere generation module 602 and determines the slant range profile and the radiative environment between the target and the sensor. Once the target to sensor path is determined by scenario generation module 604 and the effects of the environment are known based on the acquired data and the radiative environment, atmospheric correction needs to be performed.

Atmospheric correction module 606 receives a scenario generation data 626, which includes the target to sensor slant range path and also the effects of the radiative environment. Sensor observation module 618 receives sensor responsivity, target emissivity area, and at sensor irradiance as inputs, which may be part of a database.

Sensor responsivity relates a signal to the sensor responsiveness in different spectral bands with varying wavelengths. As the signal passes through a non-homogeneous atmosphere, the amount of refraction varies based on the wavelength. In order to perform atmospheric correction, actual sensor responsivity is required in response to the atmospheric effects to make the proper atmospheric corrections.

Target emissivity area represents the emission rate that is the percentage of the energy being emitted times the area being emitted, and is represented by a number like meter square. It is desirable to calculate the target emissivity area in order to determine the size of the target and also to determine what fraction of the target is actually emitting.

At sensor irradiance implies the electromagnetic radiation incident on the surface of the sensor aperture. Actual sensor observation is at sensor irradiance and makes use of the target emissivity area and is measured in watts per steradian.

Sensor observation module 618 makes use of sensor responsivity, target emissivity area and at sensor irradiance in order to generate a sensor observation data 634, which is required for atmospheric correction.

Atmospheric effects removal module 620 receives sensor observation data 634 from sensor observation module 618 and calculates the mean transmittance. Mean transmittance is determined by combining the path background rating and the path transmittance at the correct wavelength. Mean transmittance implies the total amount of radiation received at the sensor. For example, for 70% mean transmittance, dividing the at-sensor irradiance by 0.7 provides what the sensor is actually emitting. Atmospheric effects removal module 620 therefore removes the errors introduced by the atmosphere and provides a mean transmittance signal 636 to pristine target signal module 622.

Pristine target signal module 622 generates a more pristine target signal as a result of atmospheric correction provided by the ACS in accordance with aspects of the present invention. Mean transmittance signal 636 is applied to the actual intensity, which is being collected by the sensor. Pristine target signal module 622 corrects that intensity in order to generate a pristine target signal.

Atmospheric correction module 606 takes in scenario generation data 626, which includes the target to sensor slant range path and also the effects of the radiative environment, and sensor observation data 634, removes the errors introduced by the operational atmosphere and generates a pristine target signal.

The ACS technology in accordance with aspects of the proposed invention calculates slant-range atmospheric profiles as inputs to MODTRAN rather that a single vertical profile. The ACS handles any geometry of interest to the intelligence community (IC). These geometries include: air-to-air, air-to-ground, air-to-space, space-to-ground, space-to-air, space-to-space (but through the atmosphere), ground-to-space, and ground-to-air. The ACS also has the capability to accurately generate slant-range profiles with geometries that do not monotonically increase or decrease along the line of sight for which the radiative transfer codes such as MODTRAN require.

The ACS primarily supports long slant-range target to sensor lines of sight. Long slant-range target to sensor lines of sight often present a unique geometry that forces the operator to consider the position of the target to sensor line of sight in relation to the Earth's Limb when constructing a representative atmospheric profile. The slant-path is based on the calculated geometry that connects the location of the sensor and the target as specified by the user. Few examples of slant-range geometries are explained below using FIG. 7.

Figure 7:
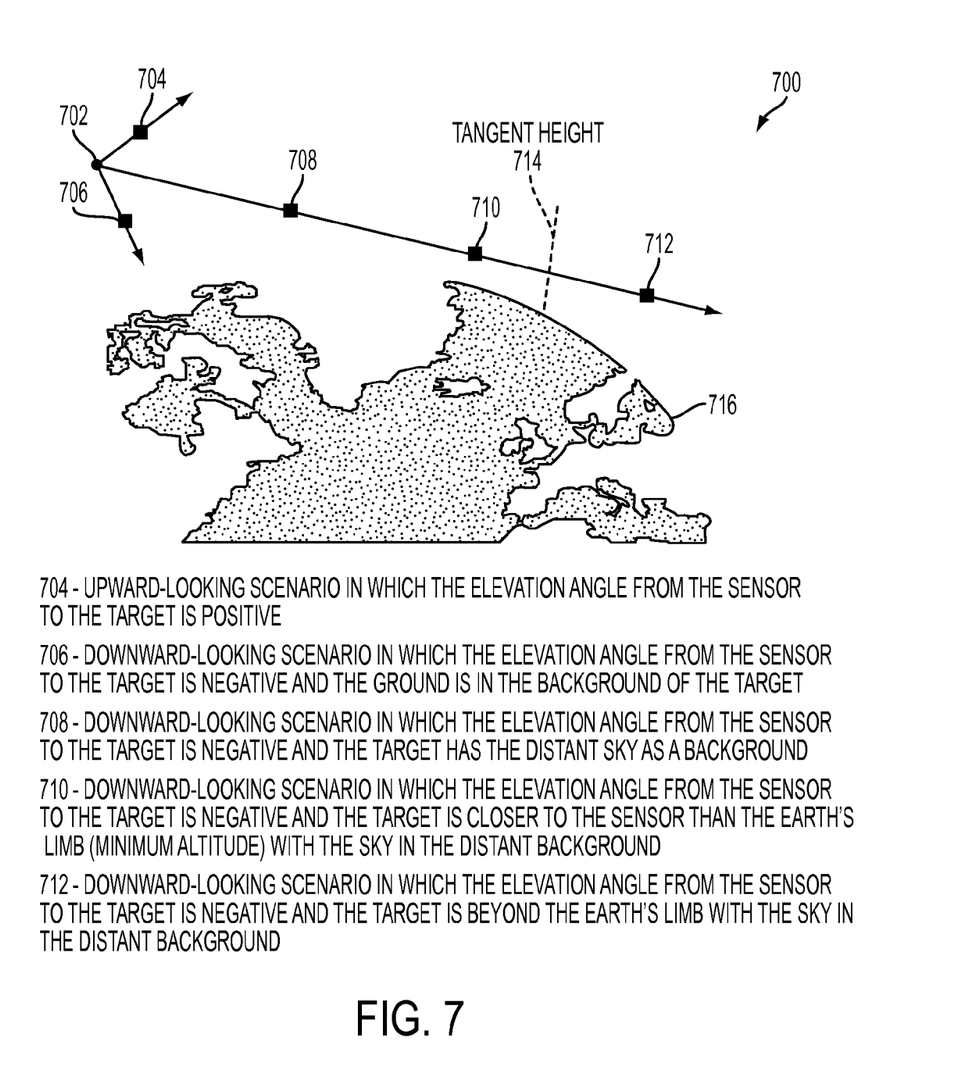
FIG. 7 illustrates examples of slant-range geometries considered by ACS, in accordance with an aspect of the present invention.

FIG. 7 illustrates examples of slant-range geometries considered by ACS 600, in accordance with an aspect of the present invention.

FIG. 7 shows a sensor 702, an earth surface 716 and a tangent height 714. Slant-range profile generator 614 takes in to account different scenarios when calculating line of sight geometry as illustrated in FIG. 7. Tangent height 714 represents an imaginary line, which is perpendicular to earth surface 716. Points 704, 706, 708, 710 and 712 represent different scenarios of the location of the target with respect to tangent height 714.

Point 704 represents upward looking scenario in which the elevation angle from sensor 702 to the target is positive. Point 706 represents downward looking scenario in which the elevation angle from sensor 702 to the target is negative and the ground is in the background of the target. Point 708 represents downward looking scenario in which the elevation angle from sensor 702 to the target is negative and the target has the distant sky as a background. Point 710 represents downward looking scenario in which the elevation angle from sensor 702 to the target is negative and the target is closer to sensor 702 than the earth's limb (minimum altitude) with the sky in the distant background. Point 712 represents downward looking scenario in which the elevation angle from sensor 702 to the target is negative and the target is beyond the earth's limb with the sky in the distant background. The geometry for a case that has a minimum altitude amid the line of sight is monotonically segmented prior to being inputted into the radiative transfer code and the atmospheric correction is evaluated as the sum of its parts.

As discussed above using FIGS. 6-7, ACS 600 in accordance with aspects of the proposed invention performs data acquisition and data assimilation to generate a 3-D data cube, which represents an atmospheric profile over an area of interest. ACS 600 acquires data from multiple data acquisition sources, some of which include systems or services that provide numerical weather nowcasting and forecasting, climatology information, aerosol modeling, non-weather sensor information, solar illumination and meteorology information, etc. The assimilated data used by ACS 600 comes from both traditional and non-traditional sources as discussed earlier.

ACS 600 further generates a slant range profile by calculating the line of sight geometry based on the target and the sensor locations and the sensor parameters. ACS 600 integrates the effects of radiative environment for scenario generation between the target and the sensor. Finally, ACS 600 performs atmospheric correction based on the atmosphere generation and scenario generation by removing the atmospheric effects in order to generate a pristine target signal.

An ACS capability is introduced, which allows the user to subtract the radiative signature of their operational atmosphere from remotely sensed line of sight data in order to reveal the more pristine signature of a target. The ACS generates a slant-range path based on arbitrary geometry that models the sensor to target relationship. This path takes the atmosphere and obstructions between the two endpoints into account when determining the atmospheric profile. The ACS uses assimilation to incorporate weather data from multiple sources and constructs an atmospheric profile from the best available data. The ACS allows the user to take advantage of variable weather and information along the path to get improved atmospheric compensation information to improve the utility of their ISR (Intelligence, Surveillance, and Reconnaissance) and other systems. Similar tools require the user to select a single vertical profile to represent atmosphere over a several Kilometer path. The method used by the ACS will lead to increased accuracy in the derived atmospheric compensation value.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. A system for use with a sensor, a target and atmosphere data between the sensor and the target to produce a target signal, said system comprising:
    an observation setup portion operable to generate sensor location data based on a location of the sensor and to generate target location data based on a location of the target;
    a slant-range profile generator operable to generate slant-range profile data based on the sensor location data and the target location data;
    a radiative environment portion operable to generate environment data of an atmosphere at two locations in the atmosphere, respectively, along a slant-range path between the sensor and the target based on the atmosphere data between the sensor and the target;
    a sensor observation portion operable to generate sensor parameter data based on a parameter of the sensor;
    an atmospheric effects removal portion operable to generate mean transmittance data of the atmosphere data between the sensor and the target based on the slant-range profile data, the environment data, and the sensor parameter data; and
    a target signal generator operable to generate the target signal based on the mean transmittance data.

2. The system of claim 1, wherein said observation setup portion is operable to generate the sensor location data based additionally on a responsivity of the sensor.

3. The system of claim 1, wherein said slant-range profile generator being operable to generate the slant-range profile data by incrementally sampling the atmosphere along an actual line of sight between the sensor location data and the target location data.

4. The system of claim 1, wherein said radiative environment portion is operable to generate the environment data of the atmosphere at the two locations in the atmosphere, respectively, along the slant-range path between the sensor and the target as electromagnetic parameters of the atmosphere at the two locations.

5. The system of claim 1, wherein said sensor observation portion is operable to generate the sensor parameter data based on a responsivity of the sensor.

6. A method of using a sensor, a target, and atmosphere data between the sensor and the target to produce a target signal, said method comprising:
    generating, via an observation setup portion, sensor location data based on a location of the sensor;
    generating, via the observation setup portion, target location data based on the location of the target;
    generating, via a slant-range profile generator, slant-range profile data based on the sensor location data and the target location data;
    generating, via a radiative environment portion, environment data of the atmosphere at two locations in the atmosphere, respectively, along a slant-range path between the sensor and the target based on the atmosphere data between the sensor and the target;
    generating, via a sensor observation portion, sensor parameter data based on a parameter of the sensor;
    generating, via an atmospheric effects removal portion, mean transmittance data of the atmosphere between the sensor and the target based on the slant-range profile data, the environment data, and the sensor parameter data; and
    generating, via a target signal generator, the target signal based on the mean transmittance data.

7. The method of claim 6, wherein said generating, via the observation setup portion, of the sensor location data based on the location of the sensor comprises generating the sensor location data based additionally on a responsivity of the sensor.

8. The method of claim 6, wherein said generating, via the slant-range profile generator, of the slant-range profile data based on the sensor location data and the target location data comprises generating slant-range profile data by incrementally sampling the atmosphere along an actual line of sight between the sensor location data and the target location data.

9. The method of claim 6, wherein said generating, via the radiative environment portion, of the environment data of the atmosphere at two locations, respectively, along the slant-range path between the sensor and the target based on the atmosphere data between the sensor and the target comprises generating the environment data of the atmosphere at the two locations in the atmosphere, respectively, between the sensor and the target as electromagnetic parameters of the atmosphere at the two locations.

10. The method of claim 6, wherein said generating, via the sensor observation portion, of the sensor parameter data based on the parameter of the sensor comprises generating the sensor parameter data based on a responsivity of the sensor.

11. A tangible, non-transitory, computer-readable media having computer-readable instructions stored thereon, the computer-readable instructions being capable of being read by a computer to be used with a sensor, a target, and atmosphere data between the sensor and the target to produce a target signal, the computer readable instructions being capable of instructing the computer to perform:
    generating, via an observation setup portion, sensor location data based on a location of the sensor;
    generating, via the observation setup portion, target location data based on the location of the target;

generating, via a slant-range profile generator, slant-range profile data based on the sensor location data and the target location data;

generating, via a radiative environment portion, environment data of the atmosphere at two locations in the atmosphere, respectively, along a slant-range path between the sensor and the target based on the atmosphere data between the sensor and the target;

generating, via a sensor observation portion, sensor parameter data based on a parameter of the sensor;

generating, via an atmospheric effects removal portion, mean transmittance data of the atmosphere between the sensor and the target based on the slant-range profile data, the environment data, and the sensor parameter data; and generating, via the target signal generator, a target signal based on the mean transmittance data.

12. The computer-readable media of claim 11, wherein the computer-readable instructions being capable of instructing the computer to perform said generating, via the observation setup portion, of the sensor location data based on the location of the sensor comprises computer-readable instructions being capable of instructing the computer to generate the sensor location data based additionally on a responsivity of the sensor.

13. The computer-readable media of claim 11, wherein the computer-readable instructions being capable of instructing the computer to perform said generating, via the slant-range profile generator, of the slant-range profile data based on the sensor location data and the target location data comprises computer-readable instructions being capable of instructing the computer to generate slant-range profile data by incrementally sampling the atmosphere along an actual line of sight between the sensor location data and the target location data.

14. The computer-readable media of claim 11, wherein the computer-readable instructions being capable of instructing the computer to perform said generating, via the radiative environment portion, of the environment data of the atmosphere at two locations, respectively, along the slant-range path between the sensor and the target based on the atmosphere data between the sensor and the target comprises computer readable instructions being capable of instructing the computer to generate the environment data of the atmosphere at the two locations in the atmosphere, respectively, between the sensor and the target as electromagnetic parameters of the atmosphere at the two locations.

15. The computer-readable media of claim 11, wherein the computer-readable instructions being capable of instructing the computer to perform said generating, via the sensor observation portion, of the sensor parameter data based on the parameter of the sensor comprises computer-readable instructions being capable of instructing the computer to generate the sensor parameter data based on a responsivity of the sensor.

16. The system of claim 1, wherein the atmospheric effects removal portion operable to generate the mean transmittance data of the atmosphere data between the sensor and the target based on the slant-range profile data, the environment data, and the sensor parameter data by at least combining a path background rating and a path transmittance at a first wavelength.

17. The method of claim 6, wherein generating, via the atmospheric effects removal portion, of the mean transmittance data of the atmosphere between the sensor and the target based on the slant-range profile data, the environment data, and the sensor parameter data comprises at least combining a path background rating and a path transmittance at a first wavelength.

18. The method of claim 11, wherein the computer-readable instructions being capable of instructing the computer to perform said generating, via the atmospheric effects removal portion, of the mean transmittance data of the atmosphere between the sensor and the target based on the slant-range profile data, the environment data, and the sensor parameter data by at least combining a path background rating and a path transmittance at a first wavelength.

* * * * *